(12) United States Patent
Cronan

(10) Patent No.: US 12,325,459 B2
(45) Date of Patent: Jun. 10, 2025

(54) MOBILE TOOL CADDY WITH INBUILT LIGHTS

(71) Applicant: Alan J. Cronan, Grass Lake, MI (US)

(72) Inventor: Alan J. Cronan, Grass Lake, MI (US)

( * ) Notice: Subject to any disclaimer, the term of this patent is extended or adjusted under 35 U.S.C. 154(b) by 0 days.

(21) Appl. No.: 17/727,781

(22) Filed: Apr. 24, 2022

(65) Prior Publication Data

US 2023/0339528 A1 Oct. 26, 2023

(51) Int. Cl.
*B62B 3/00* (2006.01)
*B25H 3/06* (2006.01)
*B62B 11/00* (2006.01)

(52) U.S. Cl.
CPC .............. *B62B 3/005* (2013.01); *B25H 3/06* (2013.01); *B62B 11/00* (2013.01); *B62B 2202/48* (2013.01)

(58) Field of Classification Search
CPC ........... B62B 3/005; B62B 3/00; B62B 3/007; B62B 3/002; B62B 11/00; B62B 2202/48; B62B 2202/50; B62B 2203/30; B62H 3/00; B62H 3/06
See application file for complete search history.

(56) References Cited

U.S. PATENT DOCUMENTS

| | | | | |
|---|---|---|---|---|
| 4,795,180 A * | 1/1989 | Polcyn | ............ | B25H 5/00 280/32.6 |
| 5,080,381 A * | 1/1992 | Perez | ............ | B25H 5/00 280/35 |
| 5,803,586 A * | 9/1998 | Velez | ............ | F21V 33/0084 362/240 |
| 5,853,180 A * | 12/1998 | Taylor | ............ | B62B 3/10 280/47.35 |
| 6,402,002 B1 * | 6/2002 | Benton | ............ | B25H 3/04 224/904 |
| 7,273,215 B1 * | 9/2007 | Smith | ............ | B25H 3/028 280/47.35 |
| 8,151,937 B2 * | 4/2012 | Blemel | ............ | A47C 16/04 182/115 |
| 8,632,231 B1 * | 1/2014 | McCullough | ............ | B25H 5/00 362/183 |
| 9,379,528 B2 * | 6/2016 | Shaw | ............ | H02G 3/0456 |
| 9,623,551 B1 * | 4/2017 | Bowen | ............ | B25H 5/00 |
| 10,500,714 B2 * | 12/2019 | Hunter | ............ | B25H 3/06 |
| 12,187,491 B2 * | 1/2025 | Squiers | ............ | B65D 25/20 |
| 2004/0188292 A1 * | 9/2004 | O'Hair | ............ | A45C 7/0031 206/349 |

(Continued)

*Primary Examiner* — James M Dolak
(74) *Attorney, Agent, or Firm* — Joseph Farco

(57) ABSTRACT

The present invention discloses a mobile tool caddy that helps a user free of additional utilities while working under a vehicle, wherein the mobile tool caddy includes a recessed tray bonded with a magnetic sheet to securely hold a different sizes of mechanical tools, and a pair of inbuilt lights to provide an instant, steady, shadowless light source thereby to easily retrieve the mechanical tools and visually see the work details as well as the mechanical tools held by the caddy. The caddy further includes a plurality of wheels to provide sufficient rolling of said caddy. The main purpose of the present invention is to provide a continuous light source to the user standing or lying under the vehicle while leaving his hands free, easy access to the mechanical tools and/or parts, and lightweight & portable unit to be moved around without any physical discomfort to the user.

19 Claims, 4 Drawing Sheets

(56) References Cited

U.S. PATENT DOCUMENTS

| | | | |
|---|---|---|---|
| 2006/0028819 A1* | 2/2006 | Shankland | B25H 5/00 |
| | | | 362/253 |
| 2007/0262619 A1* | 11/2007 | Blemel | A47C 9/027 |
| | | | 297/5 |
| 2011/0227303 A1* | 9/2011 | Gering | B25H 5/00 |
| | | | 362/183 |
| 2018/0161976 A1* | 6/2018 | Kicsak | B62B 5/0093 |
| 2018/0250807 A1* | 9/2018 | Hunter | B25H 3/02 |

* cited by examiner

MOBILE TOOL CADDY WITH INBUILT LIGHTS

CROSS-REFERENCE TO RELATED APPLICATIONS

This application claims the benefit of U.S. Provisional Application No. 63/314,567 filed on Feb. 28, 2022, the content of which is incorporated herein by reference.

FIELD OF THE INVENTION

The present invention relates primarily to a mechanical tool tray apparatus, and more particularly it relates to a simple yet unique, improved mobile tool caddy with inbuilt lights, designed specifically to securely hold mechanical tools and/or parts and provide ample lightings to illuminate work area, thereby to easily retrieve the mechanical tools and/or parts and visually see the work area as well as the mechanical tools and/or parts held by the caddy.

BACKGROUND OF THE INVENTION

The use of rolling tool carts or tool trays are known in the prior art. The typical tool trays may consist of rolling wheels, tray and handle but are not designed for low clearance under vehicle use. Whereas some modern mechanic tool creepers may include a compartment to place lights. Most of the times when a mechanic needs to work under a car, he brings a utility light with him. Unfortunately, the best garage lighting throws shadows under the cars/vehicles. This is not a serious inconvenience for a car/vehicle raised on a lift. However, sometimes the mechanic must work under the car that is either not raised up at all or is only raised a little bit. In this case, the mechanic lies down on his creeper and rolls under the car to work, bringing with him cordless utility light that is cumbersome to position or a utility light that may trail a long electrical cord. That cord often gets in the way of the mechanic and his creeper, especially when the mechanic needs to roll from one position under the car to another. In addition, there is a problem that tools or parts may be displaced from one position to another during rolling of the creeper, that is also time consuming for the mechanics to get hold of the right tool every time.

Various prior arts have been disclosed in order to attempt and solve the aforesaid problem as this is a crowded field. A prior art U.S. Pat. No. 5,803,586A to Salvador et al. describes an illuminated tool caddy for carrying of tools and parts, and for illumination of work detail, wherein the illuminated tool caddy comprises a tool carrier and a lamp. The tool carrier is compartmentalized that slides easily along the ground for convenient transport and movement. The lamp is situated within the tool carrier and is of a height such that a bulb housing portion extends above the side walls of the tool carrier. Within the bulb housing are five individual lighting compartments, each of which contain a light bulb. Also, the lamp is removable from the tool carrier for hand-held applications where that is desired. However, the tool caddy of Salvador does not have wheels hence needs to be lifted via handles while moving it from one place to another while working, which may cause a physical discomfort to a person due to weight of the tools as well as the caddy. Also, the tray of this caddy is not bonded with any magnetic means to avoid misplacement of the tools. Moreover, the lamp assembly is quite complex in nature which may require frequent maintenance.

Another prior art U.S. Pat. No. 3,187,923A to Gaylor H Christensen describes a tray especially suitable for holding nuts, bolts, and mechanical parts for a workman, wherein the tray having a magnet attached to it for rendering attachment to a metal surface of a furnace or other piece of equipment having many expensive easy to lose small parts which is being repaired under awkward or ill-lighted conditions. However, the tray of Gaylor is limited to magnetic surface only and does not deliver non-interrupting focus lights to accomplish repairing work under the vehicles. Also, the tray of Gaylor is not furnished with any mobility equipment.

Still another prior art US20110227303A1 to Howard Lawrence Gering describes a creeper having a plurality of LED lights, wherein the LED lights may be housed in a movable member adjacent the creeper frame or in the creeper frame. However, the LED lights of this creeper need to be adjusted to focus the light on the work object. Also, the creeper assembly is extensive which may make it bulky. Moreover, the creeper is not portable in order to allow it under the vehicle that is either not raised up at all or is only raised a little bit.

Although there are many solutions available in the market to hold the mechanical tools and/or parts along with attached lighting system to illuminate the work details, they are quite complex in nature and do not adequately solve or provide a viable solution to the current problems of handling the mechanic tools and/or parts, and insufficient illumination during repairing work underneath the vehicles. The existing solutions render unsteady and cumbersome light sources. Therefore, they are clearly differentiable from the present invention both in utility and design.

The applicant is unaware of any such tool caddy apparatus or system which can be easily rolled from one place to another, can securely hold the mechanical tools and/or parts of different sizes, and provide the ample lighting integrated in the tool caddy body. More specifically, there is no such mobile tool caddy with inbuilt lights known in the prior arts that can maintain sufficient rolling mechanism as required by a user. Further, there is no such mobile tool caddy with inbuilt lights known in the prior arts that can provide an instant, stable, uniform, and shadowless illumination to carry out the work underneath the vehicles. Furthermore, there is no such mobile tool caddy with inbuilt lights known in the prior arts that can firmly accommodate the mechanical tools and/or parts without any misplacement. Moreover, there is no such mobile tool caddy with inbuilt lights known in the prior arts that is portable and compact hence to gain better access to the underbody of the vehicle which is either not completely raised up or is only raised a little bit.

The aforesaid conventional tool caddy apparatuses encounter various problems and are provided with quite limited flexibility features. On the other hand, the present invention discloses about a practical solution that provides a mobile tool caddy with inbuilt lights which is flexible to be moved around without any physical discomfort to the user. Also, the present invention discloses about secure holding of the mechanical tools and/or parts of varying sizes, and about provision of sufficient illumination in the work area. The unique characteristics and features of the present invention are, therefore, unrepresented within the conventional tool tray apparatuses. Hence, the present invention has been disclosed to provide solutions to the aforementioned needs, and to resolve the aforementioned deficiencies in the conventional systems and apparatuses.

SUMMARY OF THE INVENTION

The present invention concerns improvements in and relating to a mobile tool caddy with inbuilt lights that helps a user free of additional utilities while working under a vehicle, wherein the mobile tool caddy with inbuilt lights securely holds different sizes of mechanical tools and/or parts and provides an instant, steady, shadowless light source thereby to easily retrieve the mechanical tools and/or parts and visually see the work details as well as the mechanical tools and/or parts held by the caddy. The present invention facilitates an ample illumination at bottom, engine compartment, or any other area of the vehicle.

The primary objective of the present invention is to provide a mobile tool caddy with inbuilt lights which addresses the needs which were not fulfilled by the conventional apparatuses.

Another objective of the present invention is to provide a mobile tool caddy which is designed to provide time efficient solutions for a user to avoid carrying multiple utilities under the vehicle.

Still another objective of the present invention is to provide a mobile tool caddy which maintains sufficient rolling mechanism as required by a user.

Still another objective of the present invention is to provide a mobile tool caddy which includes a plurality of caster wheels with mounting wheel hub in order to move the caddy from one place to another.

Still another objective of the present invention is to provide a mobile tool caddy which includes a pair of inbuilt lights to provide an instant, stable, uniform, and shadowless illumination to carry out the work underneath the vehicle.

Still another objective of the present invention is to provide a mobile tool caddy which includes a rechargeable battery or a solar panel or a power cord to continuously operate inbuilt lights.

Still another objective of the present invention is to provide a mobile tool caddy which includes a power switch to control the operation of inbuilt lights.

Still another objective of the present invention is to provide a mobile tool caddy which includes a remote control feature to control the operation of inbuilt lights remotely.

Still another objective of the present invention is to provide a mobile tool caddy which includes a recessed tray to securely hold mechanical tools and/or parts of varying sizes without any misplacement during movement of the caddy.

Still another objective of the present invention is to provide a mobile tool caddy which includes a magnetic sheet removably bonded within a recessed tray to provide flexibility for various attachments and keep mechanical tools and/or parts in place for the entire duration of the work, wherein the caddy facilitates easy replacements of the magnetic sheet as need arises.

Still another objective of the present invention is to provide a mobile tool caddy which includes a pair of grip handles for carrying the caddy as well as mounting the caddy under hood of the vehicle.

Still another objective of the present invention is to provide a mobile tool caddy which includes a USB charging port to charge inbuilt lights and electronic devices in order to maintain continuous power supply.

Still another objective of the present invention is to provide a mobile tool caddy which facilitates easy replacement of inbuilt lights when required.

Still another objective of the present invention is to provide a mobile tool caddy which includes an extendible pan or tray to accompany extra tools if required.

Still another objective of the present invention is to provide a mobile tool caddy which includes a parking brake system to avoid unnecessary movement of caster wheels.

Still another objective of the present invention is to provide a mobile tool caddy which includes a Wi-Fi component to facilitate a wireless connection of the other electronic devices selected from, but not limited to, a mobile phone, a speaker.

Still another objective of the present invention is to provide a mobile tool caddy which includes an anti-skid pad to avoid uncontrolled movement.

Still another objective of the present invention is to provide a mobile tool caddy which includes additional recess hooks for hanging it for storage purpose.

Still another objective of the present invention is to provide a mobile tool caddy which is lightweight, portable, and compact in order to gain better access to the underbody of vehicle which is either not entirely raised up or is only raised a little bit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

The summary is provided to introduce representative objectives of the invention in a simplified form that are further described below in the detailed description. This summary is not intended to identify key features or essential features of the claimed subject matter, nor is it intended to be used in any way that would limit the scope of the claimed subject matter.

BRIEF DESCRIPTION OF DRAWINGS

Other objects, advantages and novel features of the invention will become apparent from the following detailed description of the present embodiment when taken in conjunction with the accompanying drawings. These figures are not intended to limit the scope of the present invention but rather illustrate certain attributes thereof.

Figure 1:
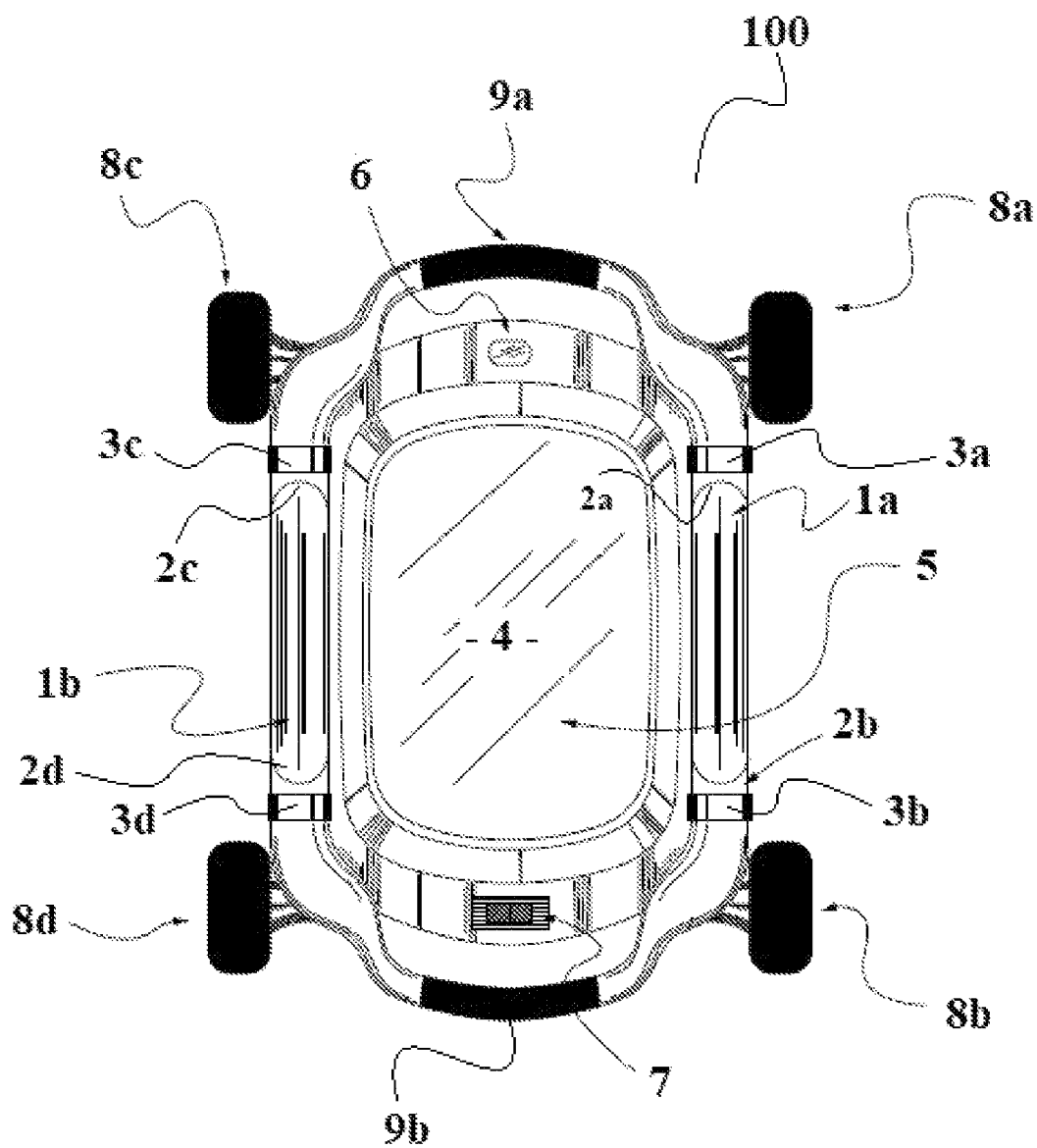
FIG. 1 illustrates a top view of a mobile tool caddy with inbuilt lights, according to an embodiment of the present invention.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

The foregoing disclosure has broadly outlined the features and technical advantages of the present disclosure in order that the description of the disclosure that follows may be better understood. It should be appreciated by those skilled in the art that the conception and specific embodiment disclosed may be readily utilized as a basis for modifying or designing other structures for carrying out the same purposes of the present disclosure. The novel features which are believed to be characteristic of the disclosure, both as to its organization and method of operation, together with further objects and advantages will be better understood from the following description.

Before explaining the present invention in detail, it is to be understood that the invention is not limited in its application to the details of the construction and arrangement of parts illustrated in the accompanying drawings. The invention is capable of other embodiments, as depicted in different figures as described above and of being practiced or carried out in a variety of ways. It is to be understood that the phraseology and terminology employed herein is for the purpose of description and not of limitation.

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

It is to be understood that the relational terms such as first and second, top and bottom, and the like may be used solely to distinguish one entity or action from another entity or action without necessarily requiring or implying any actual such relationship or order between such entities or actions.

It is to be understood that the terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

It is to be understood that the elements preceded by "comprises . . . a," "has . . . a", "includes . . . a", "contains . . . a" does not, without more constraints, preclude the existence of additional identical elements in the process, method, article, or apparatus that comprises, has, includes, contains the elements.

It is to be understood that the terms "a" and "an" are defined as one or more unless explicitly stated otherwise herein.

It is to be understood that a device or structure that is "configured" in a certain way is configured in at least that way but may also be configured in ways that are not listed.

Definitions

The term "creeper" used herein refers to a low-profile wheeled platform whereupon a mechanic may lie on their back and gain better access to the underbody of a vehicle.

The term "vehicle" used herein refers to a means for transporting people or goods, especially on land, such as, but not limited to, a car, truck, a bus, a cart.

The term "user" used herein refers to any person who needs lights while working, such as, but not limited to a mechanic, a repairman, a serviceman, a general public.

The term "recessed tray" used herein merely related to, but not limited to, a flat, shallow container with a raised rim, typically used for carrying food and drink, or for holding small items.

The term "magnetic sheet" used herein merely refers to sheet magnet is a thin layer of plastic, embedded with millions of magnetized steel particles that act like tiny magnets.

The term "USB charging port" used herein merely refers to, but not limited to, computing a type of serial port for connecting peripheral devices in a system.

The term "solar panel" used herein merely refers to devices which are used to absorb the sun's rays and convert them into electricity or heat.

The term "battery" used herein merely refers to, but not limited to, a device that stores energy and then discharges it by converting chemical energy into electricity. Typical batteries most often produce electricity by chemical means through the use of one or more electrochemical cells.

The term "anti-skid pad" used herein refers to a design constructed to prevent the skidding of a vehicle, especially by reducing hydraulic pressure in the brake system to prevent the brakes from locking.

The term "brake" used herein refers to a device or component to separate or cause to separate into pieces as a result of a blow, shock, or strain.

Reference will now be made in detail to preferred embodiments of the present invention, an example of which is illustrated in the accompanying drawings.

According to a first preferred embodiment of the present invention, a top view illustrating various components of a mobile tool caddy 100 is shown in FIG. 1. Turning to FIG. 1, the mobile tool caddy 100 comprising: a pair of indexable inbuilt lights 1a, 1b, removably positioned on opposite parallel wide edges of the caddy 100, adapted to provide uniform light source to a user while working underneath a vehicle to visually see the vehicle's components; a plurality of sleeves 2a, 2b, 2c, 2d, wherein each sleeve is installed at both ends of the respective inbuilt lights 1a, 1b, adapted to facilitate easy installation and replacement of the inbuilt lights 1a, 1b whenever required; a plurality of textured grip wheels 3a, 3b, 3c, 3d, wherein each textured grip wheel is located around the each sleeve, configured to facilitate easy removal of the inbuilt lights 1a, 1b during its replacement; a recessed tray or receptacle 4 removably attached at center of the caddy 100, adapted to receive and hold a plurality of mechanical tools and/or parts of different sizes; a magnetic sheet 5 removably bonded on the recessed tray 4, adapted to magnetically hold the plurality of mechanical tools and/or parts of different sizes for the entire duration of the work in order to avoid misplacement of the mechanical tools and/or parts; a rechargeable battery encapsulated in body of the caddy 100, adapted to supply power to the inbuilt lights 1a, 1b; a USB charging port 6, adapted to provide charging to the rechargeable battery and the inbuilt lights 1a, 1b in order to maintain continuous power supply; a power switch 7, adapted to control the operation of the inbuilt lights 1a, 1b as required by the user; a plurality of wheels 8a, 8b, 8c, 8d, wherein each wheel is located at each corner of the caddy 100, adapted to provide the sufficient rolling of the caddy 100 as required by the user; and a pair of grip handles 9a, 9b, positioned at opposite narrow edges of the caddy 100, adapted to carry or drag the caddy 100 and further configured to mount the caddy 100 under a hood of the vehicle.

According to one of the embodiments of the present invention, the inbuilt lights 1a, 1b can be provided in the form of a tube and selected from, but not limited to, a group of LED lights. The LED tube lights of the present invention provide instant, stable, uniform, and shadowless illumination at the work area. Also, the LED tube lights may be easily and efficiently manufactured and adapted in different tube sizes and colors according to the size of the recessed tray 4.

According to one of the embodiments of the present invention, the operation of the inbuilt lights 1a, 1b may be controlled remotely via a remote control feature.

According to one of the embodiments of the present invention, the USB charging port 6 is dust flap covered, and may also be utilized as an inlet for power source for the inbuilt lights 1a, 1b.

According to one of the embodiments of the present invention, the rechargeable battery may be provided with an indicator in order to indicate the user about charging status.

According to one of the embodiments of the present invention, the inbuilt lights 1a, 1b may also be continuously operated via a solar panel or a power cord.

According to one of the embodiments of the present invention, the magnetic sheet 5 holds the mechanical tools and/or parts even while rolling of the caddy 100, wherein the magnetic sheet 5 can be implemented in different sizes and thicknesses depending upon the size of the recessed tray 4. In addition, the magnetic sheet 5 within the recessed tray 4 provides flexibility for the various attachments.

According to one of the embodiments of the present invention, the recessed tray 4 contains a textured base.

According to one of the embodiments of the present invention, the grip handles 9a, 9b are provided with a textured gripping for an easy transporting of the caddy 100, whether full or empty.

Figure 2:
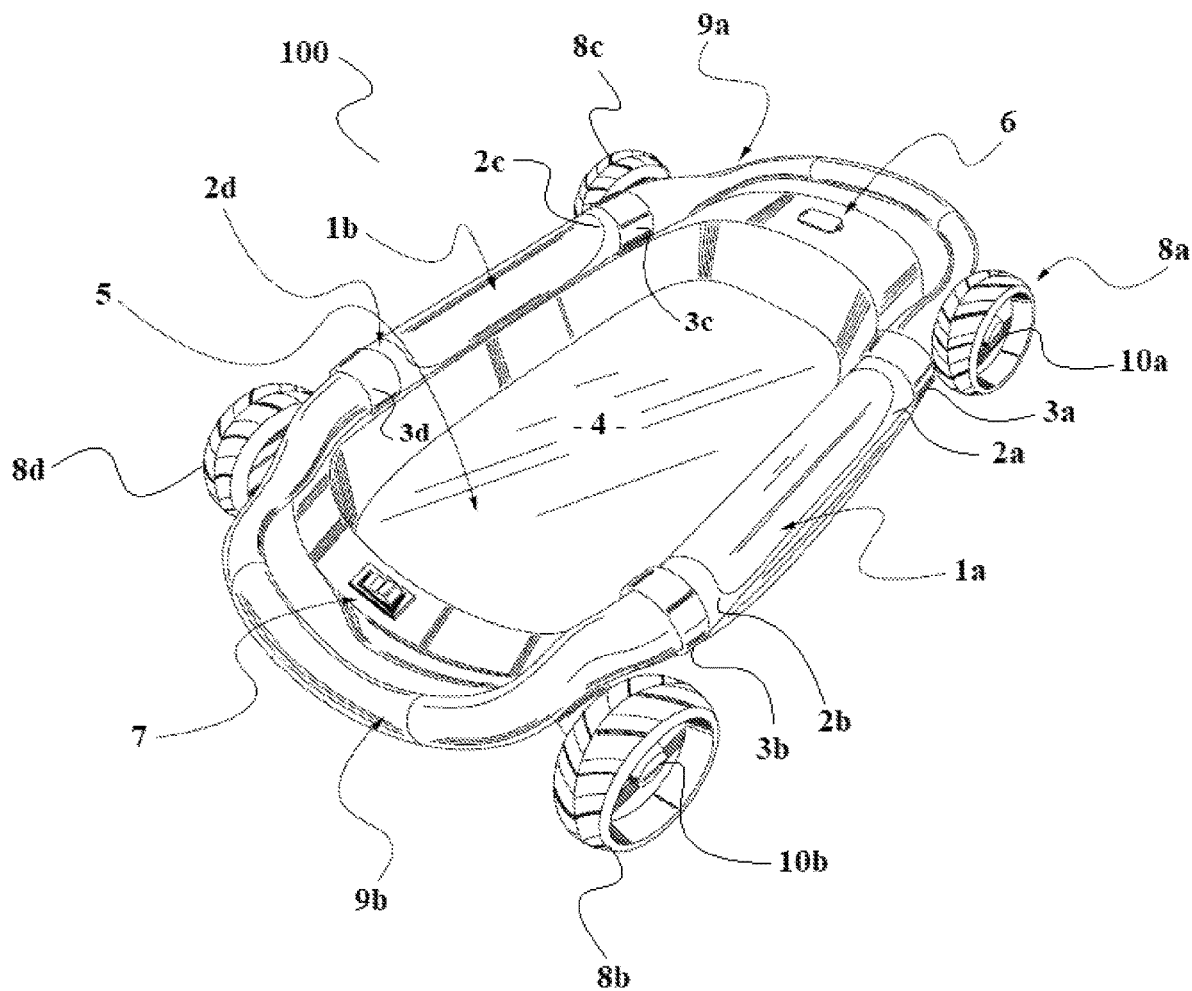
FIG. 2 illustrates an isometric view of a mobile tool caddy with inbuilt lights, according to an embodiment of the present invention.

According to a second preferred embodiment of the present invention, an isometric view illustrating the various components of the mobile tool caddy 100 is shown in FIG. 2. Turning to FIG. 2, the mobile tool caddy 100 is further comprising: a plurality of mounting wheel hubs 10a, 10b, 10c, 10d, wherein each mounting wheel hub is installed in the center of the each wheel adapted to facilitate mounting of the caddy 100 under the hood of the vehicle.

Figure 3:
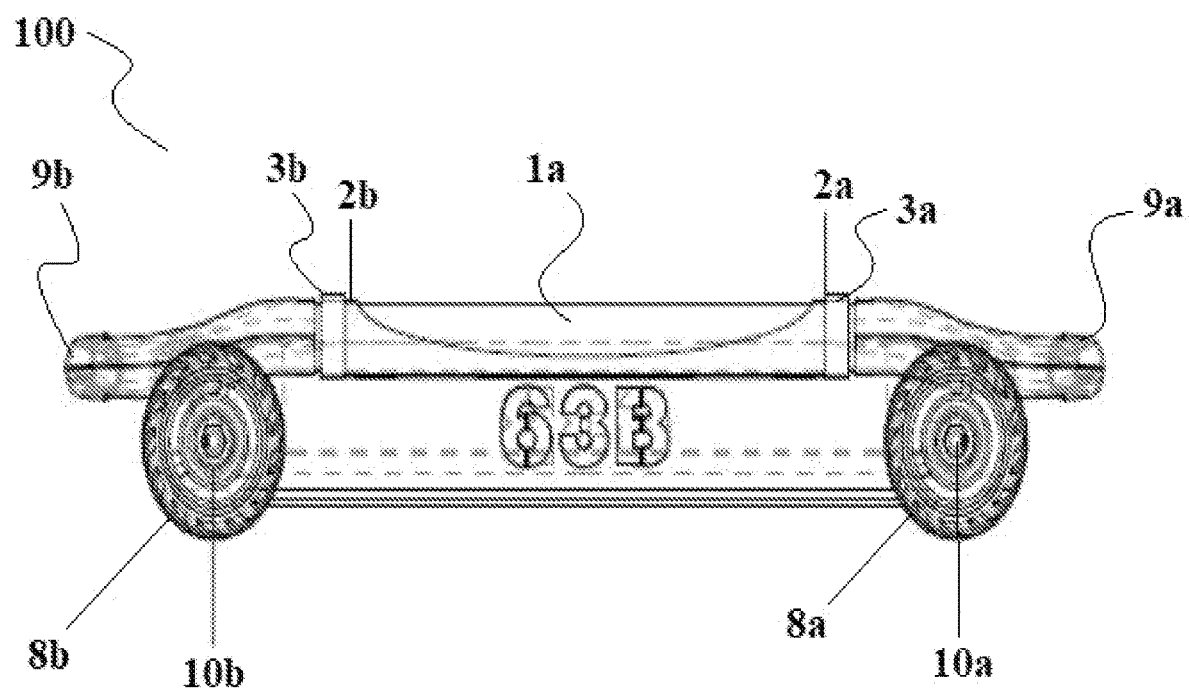
FIG. 3 illustrates a side elevation view of a mobile tool caddy facing any one inbuilt light from a pair of inbuilt lights, according to an embodiment of the present invention.

According to one of the embodiments of the present invention, the mounting wheel hubs 10a, 10b installed in the center of the respective wheels 8a, 8b, which are clearly depicted in a side elevation view of the mobile tool caddy 100 facing one of the inbuilt lights 1a, 1b as shown in FIG. 3. In an equivalent manner, the mounting wheel hubs 10c, 10d are installed in the center of the respective wheels 8c, 8d which are located at an opposite side of the mobile tool caddy 100 of FIG. 3.

According to one of the embodiments of the present invention, the mobile tool caddy 100 is further comprising a pair of axles, molded under the recessed tray 4, containing spindles for mounting of the wheels 8a, 8b, 8c, 8d, positioned on opposite ends of the caddy 100.

According to one of the embodiments of the present invention, the plurality of wheels 8a, 8b, 8c, 8d can be made up of material selected from, but not limited to, rubber or rubber tires.

Figure 4:
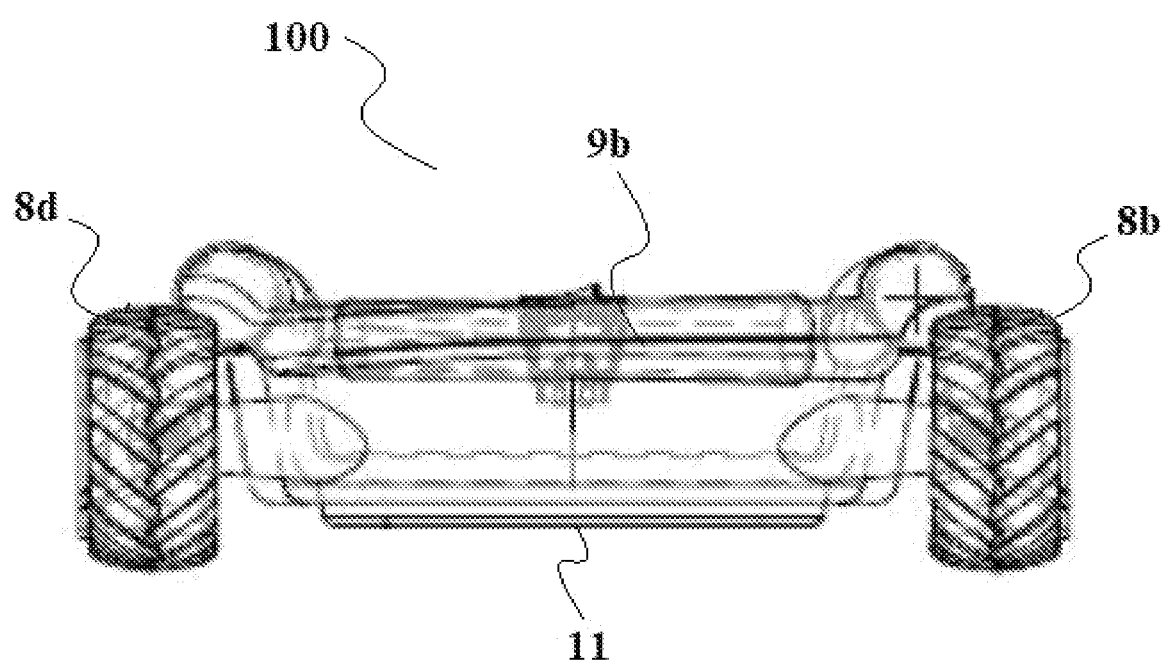
FIG. 4 illustrates a side elevation view of a mobile tool caddy facing any one grip handle from a pair of grip handles, according to an embodiment of the present invention.

According to a third preferred embodiment of the present invention, a side elevation view of the mobile tool caddy 100 facing one of the grip handles 9a, 9b is shown in FIG. 4. Referring to FIG. 4, the mobile tool caddy 100 is further comprising: an extendible pan 11 located under the recessed tray 4, adapted to accompany any additional tools if required.

According to one of the embodiments of the present invention, the mobile tool caddy 100 may further comprise a parking brake means to avoid unnecessary movements of the plurality of wheels 8a, 8b, 8c, 8d as required by the user.

According to one of the embodiments of the present invention, the mobile tool caddy 100 may further comprise a Wi-Fi component in order to establish a wireless connection with other electronic devices such as, but not limited to, a mobile phone, a speaker, etc.

According to one of the embodiments of the present invention, the mobile tool caddy 100 may further comprise an anti-skid pad in order to avoid uncontrolled movements of the caddy 100.

According to one of the embodiments of the present invention, the mobile tool caddy 100 may further comprise additional recess hooks for hanging the caddy 100 for storage purpose.

The mobile tool caddy of the present invention with the inbuilt lights is highly advantageous and well applied as compared to the conventional tool tray apparatuses. The simple and unique design of the mobile tool caddy serves a desirable function of securely holding the mechanical tools and/or parts along with providing the stable and shadowless lighting at the work area. Further, the present invention apparently eliminates the need of getting lights and tools in separate manner at the work area, especially under the vehicles. The user standing or lying under the vehicle can have a continuous light source while leaving his hands free. Also, the mechanical tools and/or parts would be easily accessible. Moreover, the caddy is lightweight and portable to be moved around without any physical discomfort to the user. Most importantly, the present invention described herein aims to provide a solution that is practical, which can be implemented into a viable commercial success.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The invention has been explained in relation to specific embodiment. It is inferred that the foregoing description is only illustrative of the present invention, and it is not intended that the invention be limited or restrictive thereto. Many other specific embodiments of the present invention will be apparent to one skilled in the art from the foregoing disclosure. All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

The invention claimed is:
1. A mobile tool caddy, comprising:
a recessed tray;
a plurality of wheels rotatably coupled to the recessed tray, wherein an axle for each of the plurality of wheels is disposed under a portion of the recessed tray;
a tubular rim circumscribing the recessed tray above each axle for each of the plurality of wheels; and a plurality of removable tubular light sources coupled to the tubular rim via a plurality sleeves, wherein each of the plurality of tubular light sources is configured to simultaneously emit light above, outside of, and within the recessed tray.

2. The mobile tool caddy of claim 1, wherein said tubular light sources comprise a group of LED lights.

3. The mobile tool caddy of claim 1, wherein said recessed tray comprises a magnetic sheet disposed on a major surface thereof.

4. The mobile tool caddy of claim 1, wherein said tubular light sources may be continuously operated via a solar panel or a power cord.

5. The mobile tool caddy of claim 1, further comprising grip handles configured to mount said caddy under a hood of said vehicle.

6. The mobile tool caddy of claim 1, wherein each of the plurality of sleeves comprises a textured grip wheel.

7. The mobile tool caddy of claim 3, wherein the magnetic sheet is bonded to the recessed tray.

8. The mobile tool caddy of claim 1, further comprising a rechargeable battery encapsulated in said caddy and adapted to supply power to said plurality of light sources.

9. The mobile tool caddy of claim 8, further comprising a USB charging port adapted to provide charging to said rechargeable battery.

10. The mobile tool caddy of claim 9, wherein said USB charging port comprises a dust flap cover.

11. The mobile tool caddy of claim 1, further comprising a power switch adapted to control the operation of said plurality of light sources.

12. The mobile tool caddy of claim 1, further comprising a plurality of mounting wheel hubs, wherein each mounting wheel hub is installed in the center of each of the plurality of wheels.

13. The mobile tool caddy of claim 1, wherein each of the plurality of axles contains spindles positioned on opposite ends of said caddy.

14. The mobile tool caddy of claim 1, further comprising an extendible pan located under said recessed tray.

15. The mobile tool caddy of claim 1, further comprising a parking brake.

16. The mobile tool caddy of claim 1, further comprising a Wi-Fi source disposed within the caddy.

17. The mobile tool caddy of claim 1, further comprising an anti-skid pad.

18. The mobile tool caddy of claim 1, further comprising recess hooks for hanging said caddy.

19. A mobile tool caddy, comprising:
a recessed tray in which is disposed a magnetic sheet;
a plurality of wheels rotatably coupled to the recessed tray, wherein an axle for each of the plurality of wheels is disposed under a portion of the recessed tray;
a tubular rim circumscribing the recessed tray above each axle for each of the plurality of wheels; and
a plurality of removable tubular light sources coupled to the tubular rim via a plurality sleeves, wherein each of the plurality of tubular light sources is configured to simultaneously emit light above, outside of, and within the recessed tray.

* * * * *